(12) United States Patent
Subbian et al.

(10) Patent No.: US 8,123,276 B2
(45) Date of Patent: Feb. 28, 2012

(54) DEPLOYABLE ENERGY MANAGING PELVIC PUSHER FOR USE IN VEHICLE

(75) Inventors: Thiag Subbian, Farmington Hills, MI (US); Nagaraj Mariyappa, Rochester Hills, MI (US); Wei Richard Wang, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 12/367,129

(22) Filed: Feb. 6, 2009

(65) Prior Publication Data

US 2010/0201112 A1    Aug. 12, 2010

(51) Int. Cl.
*B62D 21/15* (2006.01)

(52) U.S. Cl. ............. 296/146.6; 296/146.7; 296/187.12; 49/503

(58) Field of Classification Search .................. 296/68.1, 296/146.6, 187.12, 203.03, 146.7, 146.5; 49/502; 180/274

See application file for complete search history.

(56) References Cited

U.S. PATENT DOCUMENTS 4,684,166 A    8/1987    Kanodia
(Continued)

FOREIGN PATENT DOCUMENTS

KR    2005101063 A1    10/2005

*Primary Examiner* — Glenn Dayoan
*Assistant Examiner* — Pinel Romain
(74) *Attorney, Agent, or Firm* — Shook, Hardy & Bacon LLP

(57) ABSTRACT

A system for providing protection to a vehicle occupant during a side impact event is disclosed. The system includes an outer panel, which may be a vehicle door outer sheet metal, an inner panel, which may be a vehicle door trim, and an elongated structural member disposed between the outer panel and the inner panel. The elongated structural member is generally disposed perpendicularly with respect to the inner and outer panels and is in general alignment with the pelvic area of the adjacent occupant. The elongated structural member may have an I-beam configuration which extends from the outer panel to the inner panel in the occupant's pelvic zone. The elongated structure may progressively crush during the impact event while pushing the occupant. During an impact event, the elongated structure is pushed vehicle-inward and provides pelvic support to the adjacent occupant.

16 Claims, 3 Drawing Sheets

U.S. PATENT DOCUMENTS

| | | | |
|---|---|---|---|
| 4,783,114 A | | 11/1988 | Welch |
| 4,958,884 A | * | 9/1990 | Gold .................. 296/187.12 |
| 5,395,135 A | | 3/1995 | Lim et al. |
| 5,482,344 A | | 1/1996 | Walker et al. |
| 5,542,738 A | | 8/1996 | Walker et al. |
| 5,573,298 A | | 11/1996 | Walker et al. |
| 5,603,548 A | * | 2/1997 | Gandhi et al. ........... 296/146.7 |
| 5,749,600 A | | 5/1998 | Yamada et al. |
| 5,820,202 A | | 10/1998 | Ju |
| 5,857,734 A | | 1/1999 | Okamura et al. |
| 6,364,398 B1 | | 4/2002 | Kim |
| 6,851,740 B1 | | 2/2005 | Peng |
| 6,955,391 B1 | | 10/2005 | Peng |
| 7,014,249 B2 | | 3/2006 | Karuppaswamy et al. |
| 7,334,813 B2 | | 2/2008 | Mellor |
| 7,503,621 B2 | * | 3/2009 | Mani .................. 296/187.05 |
| 2007/0246925 A1 | | 10/2007 | Mani |

* cited by examiner

DEPLOYABLE ENERGY MANAGING PELVIC PUSHER FOR USE IN VEHICLE

TECHNICAL FIELD

The disclosed invention relates generally to vehicle systems for protecting occupants in the event of a side impact event. More particularly, the disclosed invention relates to an I-beam shaped pelvic pusher situated within the vehicle door between the door outer sheet metal and the door trim.

BACKGROUND OF THE INVENTION

Side impact events in vehicles have been identified as one of the top priorities for both research and regulation with government requirements continuing to become more stringent. These additional requirements make designs for door trim systems more challenging because they may impact the vehicle door at the pelvic zone. During a side impact event the rear edge of the barrier generally aligns with the occupant's thorax causing high accelerations of the ribs and the spine. In such an event it is desirable to push the pelvis early with optimum stiffness to keep the occupant away from the intruding door sheet metal. This results in lower spinal accelerations and reduced trauma to the lower thoracic area.

In an effort to provide support to the pelvic zone of the occupant during the side impact event the use of pelvic pusher foam has been employed between the outer door sheet metal and the door trim. The use of pelvic pusher foam represents an improvement in the state of the art. However, the use of pelvic pusher foam has its drawbacks and is generally an inefficient response to the need to provide support. Accordingly, as in so many areas of design, there is room for improvement in the state of the art of vehicle occupant safety.

SUMMARY OF THE INVENTION

The disclosed invention represents advancement in the art of safety systems for vehicles. The disclosed invention is a system for providing protection to a vehicle occupant during a side impact event. The system includes an outer panel, which may be a vehicle door outer sheet metal, an inner panel, which may be a vehicle door trim, and an elongated structural member disposed between the outer panel and the inner panel. The elongated structural member is generally disposed perpendicularly with respect to the inner and outer panels and is in general alignment with the pelvic area of the adjacent occupant. The elongated structural member may have an I-beam configuration which extends from the outer panel to the inner panel in the occupant's pelvic zone. The elongated structure may progressively crush during the impact event while pushing the occupant.

During an impact event, the elongated structure is pushed vehicle-inward and provides pelvic support to the adjacent occupant.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
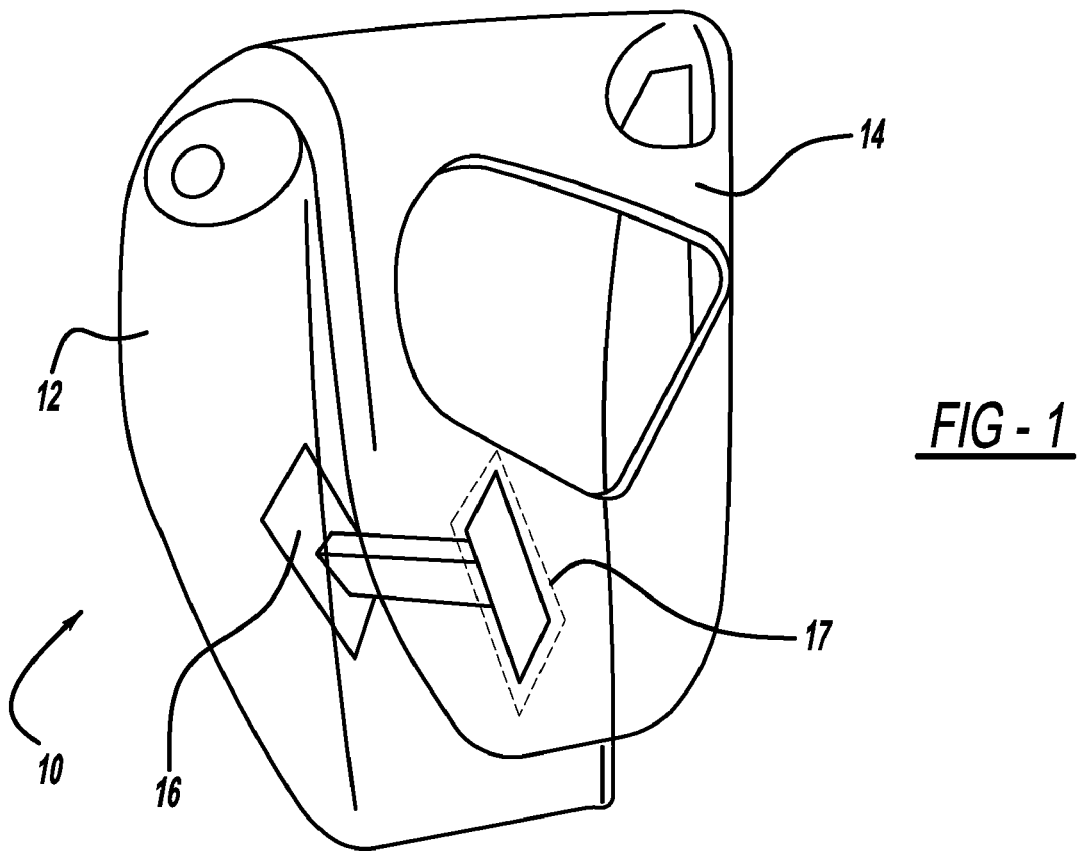
FIG. 1 illustrates a perspective view of the disclosed invention showing the pelvic pusher between the door outer sheet metal and the door trim.

In the following figures, the same reference numerals are used to refer to the same components. In the following description, various operating parameters and components are described for one constructed embodiment. These specific parameters and components are included as examples and are not meant to be limiting.

With reference to FIG. 1, a perspective view of a door assembly, generally illustrated as 10, which incorporates the pelvic pusher of the disclosed invention. Particularly, the door assembly 10 includes a door outer sheet metal 12, a door trim 14, and an I-beam pusher or pelvic pusher 16. It is to be understood that the configuration of the door assembly 10 as presented herein is for illustrative purposes only and is not intended as being limiting. For example, the door outer sheet metal 12 and the door trim 14 may be any of several configurations and sizes. By way of further example, the pelvic pusher 16 may be situated in places other than in the vehicle door and may be situated adjacent a rear seat of a two-door vehicle between the outer sheet metal and the inner trim (such configuration not being shown). Accordingly, the pelvic pusher 16 of the present invention has multiple applications. As illustrated, the pelvic pusher 16 extends between the door outer sheet metal 12 and the door trim 14 in the pelvic zone.

The door trim 14 may include a weakened area 17. The weakened area 17 is provided so that in a side impact event this area may be broken away allowing the pelvic pusher 16 to pass through the door trim 14 and to contact the pelvic area of the vehicle occupant. This feature will be discussed in detail below with respect to FIGS. 3 through 5.

Figure 2:
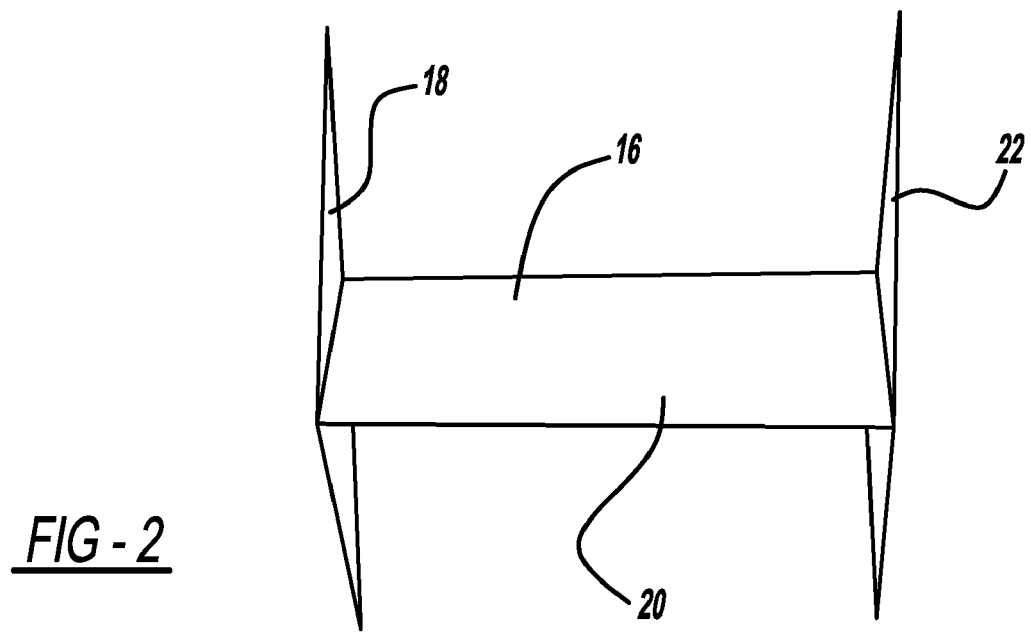
FIG. 2 illustrates a side view of the I-beam pelvic pusher of the disclosed invention.

The pelvic pusher 16 is illustrated in greater detail in FIG. 2 in which the pelvic pusher 16 is illustrated in perspective view. The pelvic pusher 16 includes an outer end plate 18, an elongated structural member 20, and an inner end plate 22. The outer end plate 18 is provided for direct or indirect attachment to the inner side of the door outer sheet metal 12. The inner end plate 22 is provided for direct or indirect attachment to the inner side of the door trim 14.

The elongated structural member 20 may be of any of a variety of configurations including the suggested I-beam configuration that is illustrated. Preferably the elongated structural member 20 includes at least two flat pieces of material which may form a T-shape but may include three flat pieces of material to form an I-shape. The elongated structural member 20 may be triangular or box shaped. In addition the elongated structural member 20 may be tubular. It may be made out of any one of a variety of materials, including a metal or a polymerized material such as a carbon-reinforced plastic.

Regardless of its shape, the elongated structural member 20 should be configured and should be tunable so that under a certain load it can crush as will be discussed below in relation to FIG. 5.

The pelvic pusher 16 uses barrier force to deploy the door trim 14 early in a side impact event to push away the occupant and to progressively crush while pushing the occupant. As noted above, the progressive crush of the pelvic pusher 16 with energy absorption reduces both the rib and the spinal acceleration of the occupant in a dramatic way. The illustrated configuration of the disclosed invention in all its possible variations eliminates the need for traditional pelvic pusher foam and results in a significant improvement in occupant CAE rating, particularly for the rear occupant.

Figure 3:
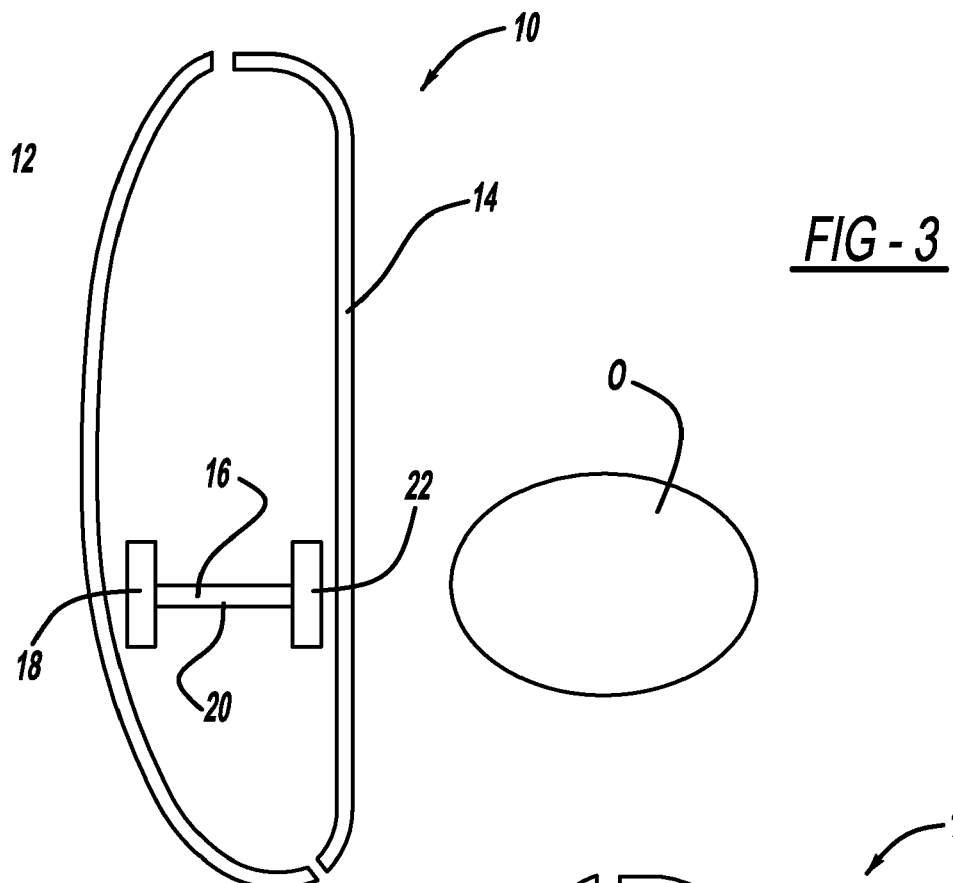
FIG. 3 illustrates a side sectional view of the assembled door outer sheet metal, the pelvic pusher, and the door trim relative to an occupant prior to a side impact event.
Figure 4:
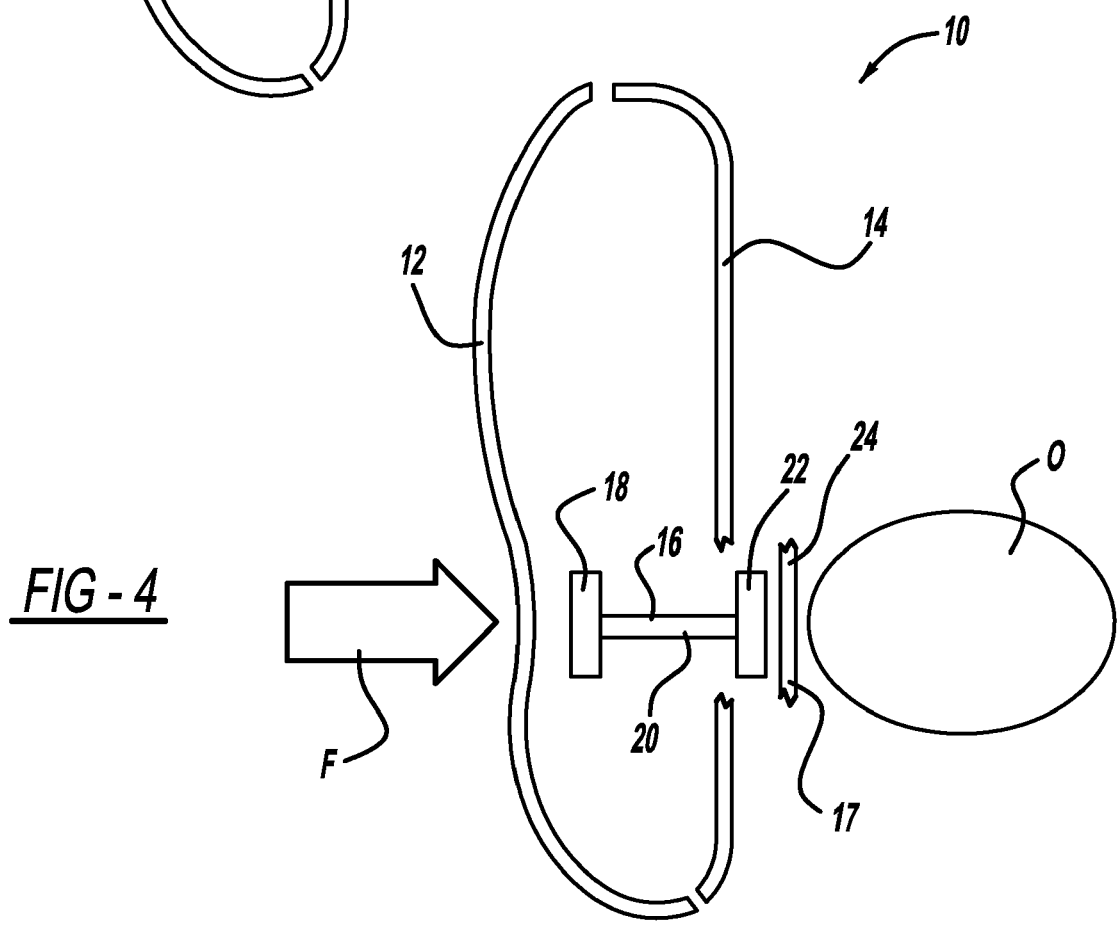
FIG. 4 is similar to the view shown in FIG. 3 but shows an impacting force at an early stage of a side impact event where the pelvic pusher initially contacts the occupant.
Figure 5:
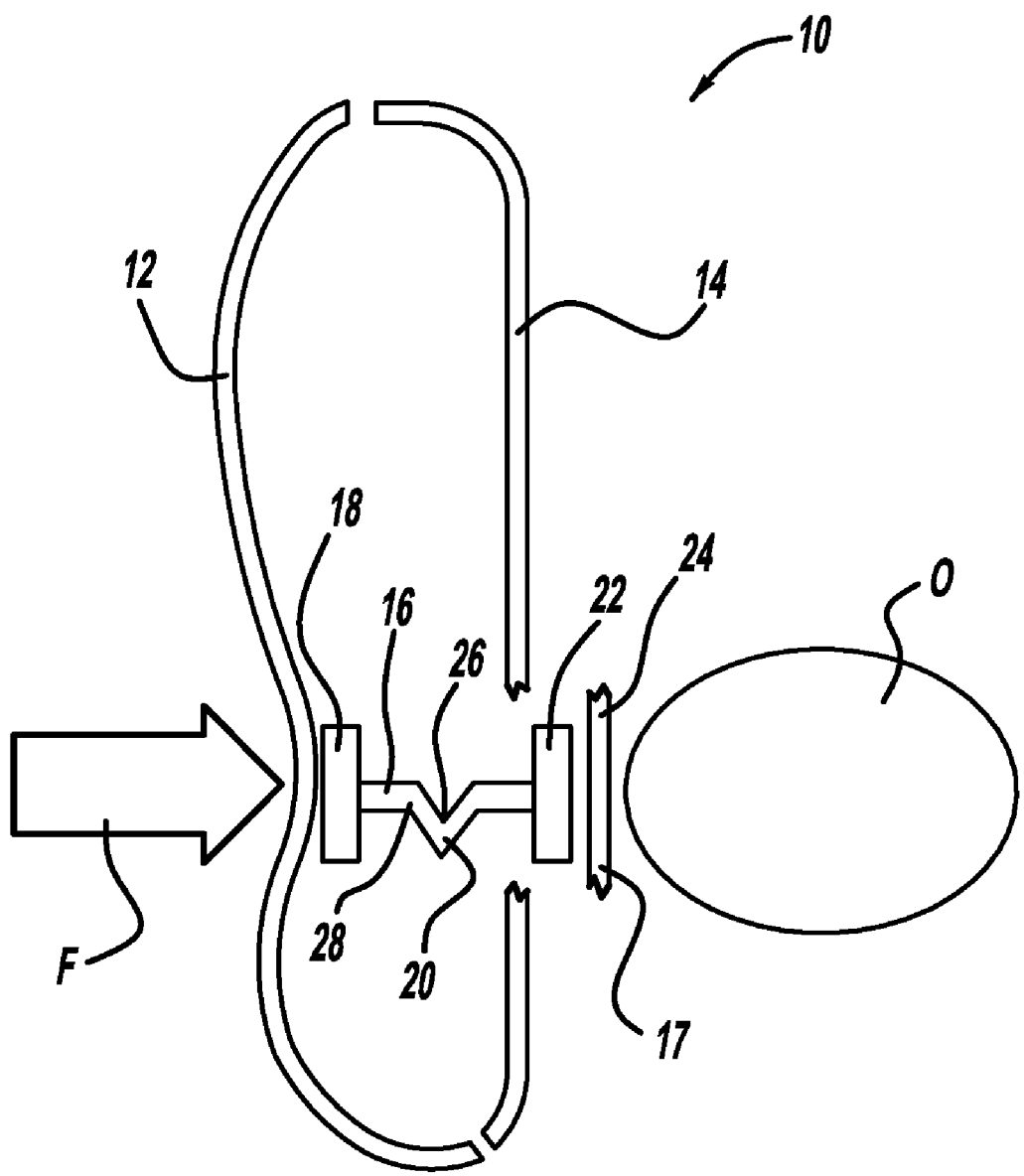
FIG. 5 is similar to the view shown in FIG. 4 but shows the impacting force at a later stage of a side impact event where the movement of the occupant has been restricted and the pelvic pusher has begun to crush.

FIGS. 3 through 5 illustrate the door assembly 10 through the progression of a side impact event. Referring first to FIG. 3, the door assembly 10 is shown prior to a side impact. As illustrated, an occupant O is seated adjacent the door trim 14.

Referring to FIG. 4, in the event of a side impact, a force F begins to be asserted against the door outer sheet metal 12 and, as a consequence, the pelvic pusher 16 begins to move vehicle inward. In the event that the optional weakened area 17 is provided a punched out fragmented portion 24 of the door trim 14 is torn away and the inner plate end 22 of the pelvic pusher 20 passes through the remaining portion of the door trim 14 and contacts the occupant O at n seconds following impact by the force F.

Referring to FIG. 5, at n+x seconds following impact by the force F, the vehicle outward movement of the occupant O has been substantially halted or considerably slowed by contact with the vehicle inward movement of the pelvic pusher 16. If the pelvic pusher 16 has been so configured, it demonstrates a gradual collapse as shown in FIG. 5. The collapse may be initiated by one or more trigger points 26 and 28 formed on the pelvic pusher 16 as illustrated. It is not necessary for the pelvic pusher 16 to be formed with the trigger points 26 and 28. Furthermore, it is possible for the pelvic pusher 16 to be formed such that it is allowed to twist on impact, thus also gradually collapsing in a side impact event.

The foregoing discussion discloses and describes an exemplary embodiment of the present invention. One skilled in the art will readily recognize from such discussion and from the accompanying drawings and claims that various changes, modifications and variations can be made therein without departing from the true spirit and fair scope of the invention as defined by the following claims.

What is claimed is:

1. A system for providing protection to a vehicle occupant during a side impact event, the system comprising:
    an outer panel;
    an inner panel, said inner panel including a weakened area; and
    a pelvic pusher disposed between said outer panel and said inner panel, said pelvic pusher including an elongated structure, said elongated structure having a first end and a second end, said pelvic pusher further including an outer panel plate attached to said first end and an inner panel plate attached to said second end, said elongated structure being generally perpendicular to said outer panel and said inner panel and being generally aligned with the pelvic area of the vehicle occupant, said inner panel plate being attached to said inner panel, said weakened area generally outlining said inner plate, said elongated structure including a central area, said central area including a collapsible crush zone defined by at least one trigger zone.

2. The system of claim 1, wherein said elongated structure is an I-beam.

3. The system of claim 1, wherein said outer panel is a vehicle door.

4. The system of claim 1, wherein said inner panel is a vehicle door trim.

5. The system of claim 1, wherein said elongated structure includes a first attachment end for attachment to said outer panel and a second attachment end for attachment to said inner panel.

6. The system of claim 1, wherein said elongated structure includes a crush zone.

7. A system for providing protection to a vehicle occupant during a side impact event, the system comprising:
    an outer panel;
    an inner panel; and
    an I-beam structure disposed between said outer panel and said inner panel, said I-beam structure being generally perpendicular to said outer panel and said inner panel and being generally aligned with the pelvic area of the vehicle occupant, said I-beam structure including an I-beam having ends and a pair of flat members attached to said ends, each of said flat members including a middle, said I-beam ends being attached to said middles of said flat members, one of said ends being attached to said outer panel and the other of said ends being attached to said inner panel, said I-beam structure including a central area, said central area including a collapsible crush zone defined by at least one trigger zone.

8. The system of claim 7, wherein said outer panel is a vehicle door.

9. The system of claim 7, wherein said inner panel is a vehicle door trim.

10. The system of claim 7, wherein said I-beam structure includes a crush zone.

11. The system of claim 7 wherein said I-beam structure includes an inner panel attachment end and said inner panel includes a weakened area adjacent to said inner panel attachment end.

12. A pelvic pusher for placement between the outer side panel and the inner side panel of a vehicle, the pelvic pusher comprising:
    a first end for attachment to the outer panel of the vehicle;
    a second end for attachment to the inner panel of the vehicle; and
    an elongated body disposed between said first end and said second end, said elongated body having a long axis, said long axis being generally perpendicular to the outer panel of the vehicle and the inner panel of the vehicle, said elongated body including a central area, said central area including a collapsible crush zone defined by at least one trigger zone.

13. The pelvic pusher of claim 12, wherein said elongated body has at least two flat elongated members.

14. The pelvic pusher of claim 13, wherein said elongated body is an I-beam.

15. The pelvic pusher of claim 12 wherein said first end includes an outer side panel attachment plate.

16. The pelvic pusher of claim 12 wherein said second end includes an inner side panel attachment plate.

* * * * *